United States Patent [19]
Delphin et al.

[11] Patent Number: 5,880,207
[45] Date of Patent: Mar. 9, 1999

[54] ACRYLIC COMPOSITIONS

[75] Inventors: Walter H. Delphin, Germantown; Marcia O. Leach; James R. Leach, both of Drummonds; Fareeduddin Farooq; Connie D. Dickerson, both of Memphis, all of Tenn.

[73] Assignee: ICI Acrylics Inc., Wilmington, Del.

[21] Appl. No.: 544,375

[22] Filed: Oct. 17, 1995

[51] Int. Cl.$^6$ .................................................. C08L 33/12
[52] U.S. Cl. .................... 524/523; 524/522; 524/533; 525/226; 525/228; 525/304; 525/309; 526/323.1; 526/323.2; 428/407; 428/520
[58] Field of Search .................... 524/523, 522, 524/533; 525/226, 228, 304, 309; 428/407, 520; 526/323.1, 323.2

[56] References Cited

U.S. PATENT DOCUMENTS

| | | | |
|---|---|---|---|
| 4,085,246 | 4/1978 | Buser et al. | 428/220 |
| 4,159,301 | 6/1979 | Buser et al. | 264/331.15 |
| 4,959,401 | 9/1990 | Bellasalma et al. | 523/466 |
| 5,043,377 | 8/1991 | Nogi et al. | 524/437 |
| 5,130,374 | 7/1992 | Cozens et al. | 525/239 |
| 5,242,968 | 9/1993 | Minghetti et al. | 524/430 |
| 5,304,592 | 4/1994 | Ghahary | 524/437 |
| 5,415,931 | 5/1995 | Minghetti et al. | 428/327 |
| 5,521,243 | 5/1996 | Minghetti et al. | 524/437 |
| 5,530,041 | 6/1996 | Minghetti et al. | 524/81 |

*Primary Examiner*—Marion McCamish
*Assistant Examiner*—John J. Guarriello

[57] ABSTRACT

Acrylic compositions are provided which comprise a matrix of polymethyl methacrylate having dispersed within it particles comprising 75 to 90 weight percent of polymethyl methacrylate and greater than 10 to 25 weight percent of a comonomer comprising an ethylenically unsaturated monomer that copolymerizes with methyl methacrylate, wherein the particles further comprise more than 0.4 weight percent of a crosslinker.

19 Claims, 2 Drawing Sheets

ACRYLIC COMPOSITIONS

FIELD OF THE INVENTION

The present invention is directed to an acrylic composition which can be processed into sheet material having a granite appearance. More specifically, the present invention is directed to an acrylic composition comprising a matrix of polymethyl methacrylate having dispersed within it particles of polymethyl methacrylate and a comonomer.

BACKGROUND OF THE INVENTION

Polymer products, particularly acrylic products, having a granite appearance and methods for their production are known in the art. Such products have found particular application in the spa and bathware industries.

In general, known methods for the production of acrylic compositions to form acrylic sheet products having a granite appearance comprise the addition of various inorganic or organic particles or fillers to an acrylic solution or syrup. For example, U.S. Pat. Nos. 4,159,301 and 4,085,246 disclose a simulated granite material comprising a matrix of acrylic polymer and various opaque and translucent particles having specific optical densities. U.S. Pat. No. 5,304,592 discloses a simulated mineral article comprising a plastic material suspended within a thermoplastic matrix. The plastic material comprises both a thermoplastic and thermoset plastic and the matrix consists essentially of a themoplastic material. U.S. Pat. No. 5,043,077 discloses a granite-like artificial stone comprising a matrix of radical-polymerizable monomers (containing methacrylate and an aromatic vinyl compound) and an inorganic filler, where the filler comprises radical-polymerizable monomers which may be the same or different than those used in the matrix. U.S. Pat. No. 4,959,401 discloses a composition suitable for making synthetic rock comprising an organic portion comprising one or more polymers and an inorganic filler portion comprising an oxide pigment, kaolin and a binder. However, each of these compositions have demonstrated difficulties in processing and later thermoforming.

In an attempt to advantageously affect the processing and thermoforming characteristics of the compositions suitable for forming granite-like products, U.S. Pat. Nos. 5,242,968 and 5,415,931 provide an acrylic product having a matrix of polymethyl methacrylate containing preformed particles of polymethyl methacrylate. The preformed particles are preferably scrap material and comprise 90% of polymethyl methacrylate and 1% of crosslinker, the remainder of the particles being comonomer.

The use of a polymeric material as the particulate or filler component of such compositions has been found to be preferred over the various fillers previously used. Such particles provide sufficient opacity to the composition for hiding and decorative purposes. However, care must be taken in formulating such compositions since the polymeric particles will swell due to the absorption of the matrix monomer to a volume that may be several times greater than their initial volume. The swelling of the particles will increase the viscosity of the composition and prevent the particles from settling.

Such compositions have been used in practice only with difficulty, as the size and swelling of the particles have not been heretofore optimized. In order to produce a material which is easily prepared, aesthetically pleasing and particularly suitable for further processing, the size and swelling rate of the particles must be controlled and optimized. In conventional methods for preparing granite-appearing acrylic materials, such as that disclosed in the U.S. Pat. Nos.5,243,968 and 5,415,931 patents, the particles are often made from cell cast, continuous cast or extruded sheet material. These particles are often difficult to use as they either swell to an extent or at a rate which does not provide optimum results.

If the particles swell too much, the composition may absorb nearly all of the liquid or matrix phase, making its viscosity so great as to be unworkable. Alternatively, the particles may dissolve, losing their character altogether. If the particles do not swell to a sufficient degree, the mixture may not increase in viscosity efficiently, allowing the particles to settle, thus detracting from the granite aesthetic. On the other hand, if the particles swell too slowly, the manufacturing process must be designed to accommodate a dynamic mixture which is constantly changing in viscosity or sufficient processing time must be allowed to allow the composition to reach equilibrium.

SUMMARY OF THE INVENTION

Accordingly, it is an object of the present invention to provide an acrylic composition suitable for processing into a product having a granite appearance comprising particles which are formulated to allow the processor to optimize the extent of particle swelling, the rate of particle swelling and the thermoforming properties of the final product.

In order to accomplish this objective, the present invention is directed to an acrylic composition comprising a matrix of polymethyl methacrylate having dispersed within it particles comprising 75 to 90 weight percent of polymethyl methacrylate and greater than 10 to 25 weight percent of a comonomer comprising an ethylenically unsaturated monomer that copolymerizes with methylmethacrylate, wherein said particles further comprise more than 0.4 weight percent of a crosslinker.

The present invention is further directed to a process for preparing a thermoformed article comprising thermoforming a cured acrylic composition comprising a matrix of polymethyl methacrylate having dispersed within it particles comprising 75 to 90 weight percent polymethyl methacrylate and greater than 10 to 25 weight percent of a comonomer comprising an ethylenically unsaturated monomer that copolymerizes with methylmethacrylate, wherein said particles comprise more than 0.4 weight percent of a crosslinker. Thermoformed products prepared by the process are also within the scope of this invention.

DETAILED DESCRIPTION OF THE INVENTION

Figure 1:
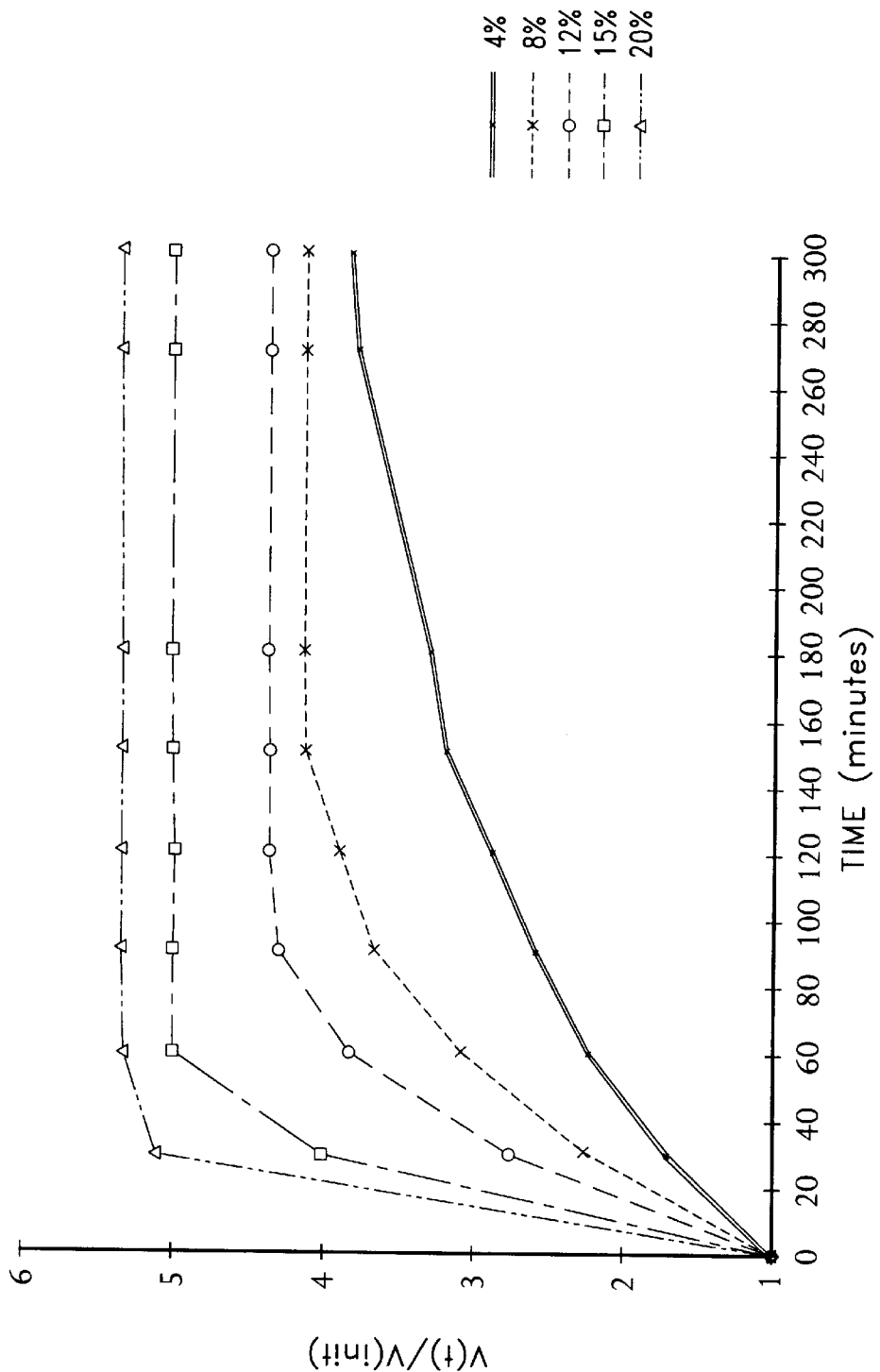
FIG. 1 is a graph showing the effect of comonomer concentration on the swelling and the swelling rate of the particles used in the present composition over time.

The polymethylmethacrylate (PMMA) matrix utilized in the present composition is prepared prior to the addition of the particles. The matrix is prepared by mixing a PMMA syrup which contains about 25% of PMMA solids with excess MMA monomer. PMMA syrup is prepared from standard MMA which is subjected to a conventional partial polymerization process as exemplified in U.S. Pat. No.

4,152,501, the disclosure of which is incorporated herein by reference. The MMA monomer is added to the syrup in a ratio of about 1:1 to about 1:5 and preferably about 1:3 (syrup:monomer). The MMA monomer may contain small amounts, specifically less than about 5%, of other comonomers, such as butyl acrylate and ethylene glycol dimethacrylate. The MMA monomer may further comprise additives such as initiators, e.g., organic peroxides; chain transfer agents, e.g., dodecylmercaptan; and colorants, eg, titanium dioxide and carbon black.

The particles contained within the polymethyl methacrylate matrix comprise about 75 to about 90 weight percent of polymethyl methacrylate and greater than about 10 to about 25 weight percent of a comononer comprising an ethylenically unsaturated monomer that is copolynerizable with methylmethacrylate. These percentages and all other percentages disclosed herein are percent by weight of the total composition unless specifically noted. Preferably, the particles comprise about 80 to about 90 weight percent of polymethyl methacrylate and about 10 to about 20 weight percent weight of the comononer. Preferably, the comonomer is a lower alkyl acrylate or a lower alkyl methacrylate, having a carbon number of about $C_2$ to about $C_8$. Suitable comonomers include ethyl acrylate, butyl acrylate, propyl acrylate, isopropyl acrylate, t-butyl acrylate, isobutyl acrylate, ethyl methacrylate, butyl methacrylate, propyl methacrylate, isopropyl methacrylate, t-butyl methacrylate and isobutyl methacrylate. Most preferably the comononer is ethyl acrylate or butyl acrylate.

The particles further comprise more than about 0.4 weight percent of a crosslinker. Preferably the particles comprise about 0.5 to about 1.5 and most preferably about 0.6 to about 1.0 weight percent of a crosslinker. Suitable crosslinkers are selected from the group consisting of allyl methacrylate, allyl acrylate, triallylphosphate, diallyl maleate, methallyl acrylate, vinyl methacrylate, divinyl benzene, ethylene glycol dimethacrylate, diethylene glycol dimethacrylate, triethylene glycol dimethacrylate and mixtures thereof. A preferred crosslinker for use in the present invention is ethylene glycol dimethacrylate (EGDMA).

The extent of the swelling and the swelling rate of the particles prepared for use in the present acrylic compositions is affected both by the amount of comonomer contained in the particles, as well as the amount of crosslinker contained in the particles.

In general, the amount of crosslinker utilized has a more pronounced effect on the extent of swelling than the rate of swelling of the particles. As the amount of crosslinker is increased, smaller swollen particles will be obtained.

However, these beneficial effects of the crosslinker utilized in the present particles are tempered by the fact that the particles become harder and less thermoformable as the amount of crosslinker is increased. This can be controlled and optimized however, by changing the amount of comonmer contained in the particles.

As can be seen in FIG. 1, at a comonomer content of 4 and 8%, the particles remain relatively small. Moreover, the particles take a relatively long period of time to reach swelling equilibrium at these concentrations of comonomer. Conversely, as the comonomer concentration within the particles is increased to 12%, 15% and 20%, the swollen particles become larger and reach equilibrium at a much faster rate. Furthermore, an increase in the amount of comonomer within the particles softens the particles and causes them to be more highly thermoformable. It is this balance between the amount of crosslinker and the amount of comonomer which provides the ability to design the acrylic composition in such a manner so that it's processing and thermoforming capabilities are optimized.

The particles useful in the present compositions should have a degree of crosslinking sufficient to provide an extractables fraction of about 5 to about 25 percent and preferably about 14 to about 20 percent when measured by ASTM D2765. However, since the polymer is made by bulk polymerization directly from monomer in the presence of relatively large amount of crosslinker, it is more highly branched than similar extractables from conventional continuous cast sheet. This can be shown by GPC viscometry.

The particles should generally have a particle size which will allow them to pass through a 30 mesh standard U.S. wire cloth sieve or about 600 microns in the smallest dimension. Preferably the particles will have a particle size of between about 250 and about 600 microns. When exposed to the monomer rich matrix, these particles will typically swell to about five times their volume in the dry state. Consequently, the particles may swell to a size of up to 3 mm when mixed with the matrix material.

If color and increased opacity is desired in the final sheet product, various colorants or fillers may be added to the particles during their formation. Suitable colorants include pigments and dyes such as carbon black and titanium dioxide. The colorants may be used in amounts of up to about 5% by weight of the dry particles and preferably about 0.1 to 3.0 percent by weight of the dry particles.

The particles utilized in the present compositions may be prepared by any suitable process known to those skilled in the art. However, it is preferred that the particles be prepared by a conventional bulk polymerization process.

Figure 2:
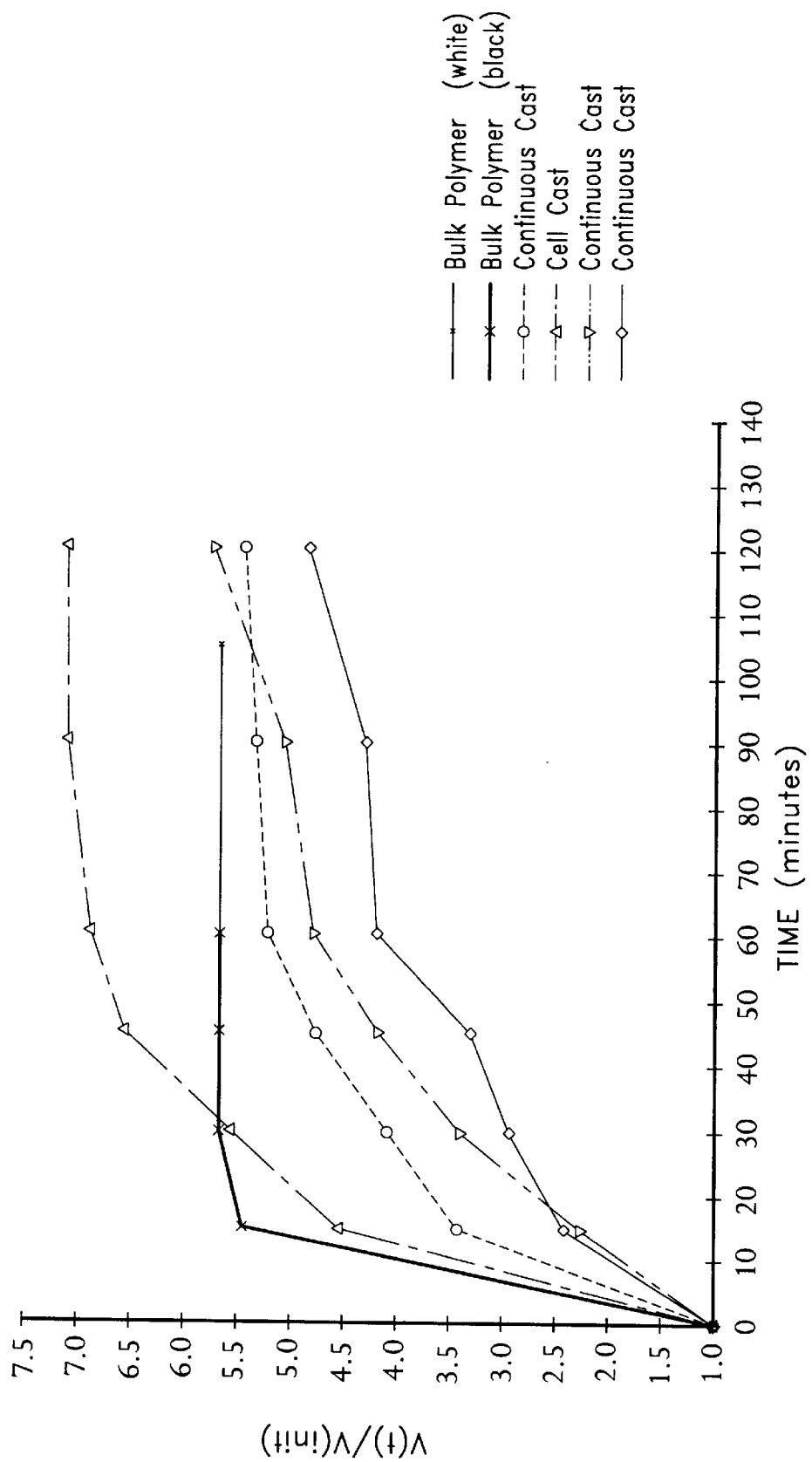
FIG. 2 is a graph comparing the swelling rate and extent of swelling of the particles used in the present composition versus particles prepared from sheet made by different processes.

FIG. 2 shows the superior performance of particles prepared by a bulk polymerization process as in accordance with the present invention in comparison to particles prepared from sheet made by other processes. In FIG. 2, the particles prepared from the bulk polymerization process swell faster than particles prepared from sheet made with a continious cast process and sheet made with a cell cast process. This makes processing faster and more efficient. Thus, bulk polymerized particles are superior in performance in comparison to particles made from other processes.

A typical bulk polymerization process suitable for use with the present invention is described in the *Encyclopedia of Polymer Science and Engineering*, Vol. 2, (1985) at p 500, the disclosure of which is incorporated herein by reference. The resultant polymer is then ground and sieved to obtain particles having the desired particle size range. Any suitable method for grinding and sieving can be utilized as will be recognized by those skilled in the art.

The present acrylic compositions comprise about 5 to about 20 weight percent and preferably about 10 to about 14 percent of the particles and about 95 to about 80 weight percent and preferably about 90 to about 86 weight percent of the matrix material. The remainder of the composition comprises additives, adjuvants and colorants as discussed below.

The present acrylic compositions may further comprise additives suitable to provide color(s) as needed for a particular application. Preferred colorants are dyes or pigments such as carbon black and titanium dioxide. Suitable colorants are added to the composition in amounts of up to about 5 weight percent and preferably about 0.1 to about 3.0 weight percent of the total composition.

Other auxiliary materials and adjuvants conventionally used in the art may be added to the present compositions (in the matrix) as needed for a particular application. Examples of such adjuvants or auxiliary materials are initiators, such as t-butyl neodecanoate and surfactants, such as sodium dilaurylsulfosuccinate.

The acrylic compositions of the present invention are prepared by mixing the particles with the polymethyl methacrylate which will form the matrix of the composition and any additional materials as necessary for a particular application. The materials can be mixed in any suitable manner as will be evident to one skilled in the art. Preferably, the materials are mixed at room temperature for about 15 to 30 minutes. The compositions are then cured by any suitable procedure which will be evident to those skilled in the art from present disclosure. However, a preferred means for curing the material consists of allowing the mixture to stand at about 82° C. for about 20 minutes and then at about 125° C. for about 7 minutes.

After curing, the acrylic compositions may then be used to prepare articles such as spas and bathware by thermoforming. Suitable thermoforming processes are well known in the art and the present invention is not limited to any one type of thermoforming process.

The present invention will now be illustrated by reference to the following specific, non-limiting examples.

EXAMPLES

Examples 1

Particle Production

White and black polymer particles were prepared using a bulk polymerization process. The following ingredients were used for the white particles and black particles, respectively.

|  | Weight (grams) |
| --- | --- |
| White Particles | |
| methyl methacrylate | 2099.50 |
| n-butyl acrylate | 405.00 |
| ethylene glycol dimethacrylate | 18.90 |
| lauryl mercaptan | 12.61 |
| TINUVIN ®-P | 0.27 |
| AEROSOL ® OT | 0.23 |
| LAUROX ® | 1.49 |
| t-butyl peroxylacetate | 0.10 |
| 50% $TiO_2$ dispersion in butyl methacrylate | 162.00 |
| Black Particles | |
| methyl methacrylate | 2229.03 |
| n-butyl acrylate | 405.00 |
| ethylene glycol dimethacrylate | 18.90 |
| lauryl mercaptan | 12.61 |
| TINUVIN ®-P | 0.27 |
| AEROSOL ® OT | 0.23 |
| LAUROX ® | 1.43 |
| t-butyl peroxylacetate | 0.10 |
| 10% dispersion of carbon black in methyl methacrylate | 27.00 |
| 15% phthallo cyanine blue in butyl methacrylate | 5.4 |
| monomethyl ether of hydroquinone | 0.03 |

TINUVIN-P ® is a UV stabilizer available from Ciba-Geigy.
AEROSOL ® OT is a surfactant available from Witco Chemical.
LAUROX ® is a solution of lauryl peroxide available from Witco Chemical.

The ingredients were mixed in a one gallon disposable plastic bottle. The mixture had a viscosity of approximately 1cP as measured with a Brookfield RVTDV-11 Viscometer. The mixture was then degassed under 23 inches of vacuum with a water aspirator in a 2000 ml vacuum flask. After degassing, the mixture was transferred to a 2 mil thick nylon bag which was fitted with a thermocouple and sealed.

The nylon bag and its contents were then placed in a Fisher Class 86A Safety Oven and taken through the heating steps set forth in Table 1.

TABLE 1

| Temperature (°C.) | Duration (mins) |
| --- | --- |
| Ambient to 61 | 30 |
| hold at 61 | 60 |
| 61 to 56 | 5 |
| hold at 56 | 900 |
| 56 to 75 | 5 |
| hold at 75 | 60 |
| 75 to 100 | 5 |
| hold at 100 | 60 |
| 100 to 130 | 5 |
| hold at 130 | 120 |
| 130 to ambient | 30 |

After cooling to ambient temperature, the bag and thermocouple were removed and discarded. The resultant polymer was ground and sieved with a standard wirecloth sieve. Sieve fractions between 600 and 250 microns (>30<60) were isolated along with particles smaller than 250 microns (Fines).

Acrylic Sheet Production

The black and white polymer particles were mixed as follows:

Acrylic Sheet Production

The black and white polymer particles were mixed as follows:

| white >30 <60 | 26.83 grams |
| --- | --- |
| white Fines | 4.37 grams |
| black >30 <60 | 6.71 grams |
| black Fines | 1.09 grams |

39.0 grams of the polymer particle mixture was mixed with the ingredients necessary to form the matrix set forth below:

|  | weight (grams) |
| --- | --- |
| ethylene glycol dimethacrylate | 0.51 |
| lauryl mercaptan | 0.42 |
| syrup of partially polymerized MMA | 89.4 |
| n butyl acrylate | 8.62 |
| methyl methacrylate | 199.04 |
| 50% $Tio_2$ dispersion | 0.68 |
| 10% Carbon Black dispersion | 0.07 |
| t-butyl peroxy neocanoate | 1.11 |
| Vazo ® 64 | 0.075 |
| Tinuvin ®-P | 0.030 |
| Aerosol ® - OT | 0.036 |
| monomethyl ether of hydroquinone | 0.006 |

These ingredients were mixed for 30 minutes in a glass bottle at a temperature of 20° C. After mixing, the material was poured into a glass cell. The mixture was allowed to polymerize at 82° C. for 20 minutes and then at 125° C. for 7 minutes. The material was then allowed to cool to ambient temperature. After cooling, a smooth, high gloss, void free plaque was obtained.

Example 2

The following ingredients were used to prepare clear, unpigmented polymer particles according to the process disclosed in Example 1. All amounts are by weight (grams).

| Ingredient | Sample A | | Sample B | |
|---|---|---|---|---|
| methyl methacrylate | 2342.40 | | 2339.70 | |
| ethyl acrylate | 324.00 | | 324.00 | |
| EGDMA | 18.90 | (0.7%) | 21.60 | (0.8%) |
| lauryl mercaptan | 12.61 | | 12.61 | |
| Laurox ® | 1.49 | | 1.49 | |
| Aerosol ® OT | 0.23 | | 0.23 | |
| t-butyl peroxy acetate | 0.10 | | 0.10 | |
| Tinuvin ® P | 0.27 | | 0.27 | |

After cooling to ambient temperature, the produced polymer was ground and sieved with a standard wirecloth sieve to the following sieve fractions:

| | |
|---|---|
| >50 | <60 |
| >40 | <50 |
| >30 | <40 |
| <30 | (Fines) |

The sieve fractions were used to prepare a laboratory casting using the ingredients set forth below:

| Ingredient | Sample A | Sample B |
|---|---|---|
| Syrup | 56.25 | 59.85 |
| n-butyl acrylate | 1.85 | 1.74 |
| EGDMA | 0.23 | 0.23 |
| lauryl mercaptan | 0.10 | 0.10 |
| t-butyl peroxy neodecante | 0.56 | 0.56 |
| Vazo ® 64 | 0.023 | 0.023 |
| Methyl methacrylate monomer | 72.99 | 69.50 |
| Particles | 18.00 | 18.00 |
| >40  <50  = 8.1 | | |
| >50  <60  = 6.3 | | |
| Fines        = 3.6 | | |

Vazo ® 64 is 2,2' azobis (2,4-dimethyl valeronitrile) available from DuPont.

The castings were cured in the manner disclosed in Example 1. The castings were then tested for their tensile properties at 185° C. using a biaxial tensile testing as disclosed in "Biaxial Stretching of Heat-Softened Plastic Sheets", L. R. Schmidt, PhD Thesis, University of Colorado (1972) (available from University Microfilms, Ann Arbor, Mich.)

| | Sample A | Sample B |
|---|---|---|
| Conc. of Particles in Casting | 12.0% | 12.0% |
| Young's Modulus | 189.3 | 222.0 |
| Ultimate Strain | 0.73 | 0.71 |
| Ultimate Stress | 66.10 | 72.90 |

Example 3

The following ingredients were used to prepare clear, unpigmented polymer in accordance with the procedure disclosed in Example 1.

| Ingredient | Sample C | Sample D |
|---|---|---|
| methyl methacrylate | 2399.16 | 2345.16 |
| ethyl acrylate | 270.00 | 324.00 |
| EGDMA | 16.2 | 16.2 |
| lauryl mercaptan | 12.61 | 12.61 |
| Laurox ® | 1.43 | 1.43 |
| t-butyl peroxy acetate | 0.10 | 0.10 |
| Tinuvin ® P | 0.27 | 0.27 |
| Aerosol ® - OT | 0.23 | .023 |

After cooling to ambient temperature, the polymer was ground and sieved with a standard wirecloth sieve to the following sieve fractions:

| | |
|---|---|
| >40 | <50 |
| >50 | <60 |
| <30 | (Fines) |

The sieved fractions were then used to prepare laboratory castings using the ingredients set forth below:

| Ingredients | Sample C | Sample D |
|---|---|---|
| Syrup | 52.47 | 55.17 |
| n-butyl acrylate | 1.96 | 1.88 |
| methyl methacrylate monomer | 76.98 (10%) | 74.16 (12%) |
| lauryl mercaptan | 0.065 | 0.065 |
| Vazo ® 64 | 0.023 | 0.023 |
| EGDMA | 0.15 | 0.15 |
| t-butyl peroxy neodecanoate | 0.56 | 0.56 |
| Particles | 18.00 | 18.00 |
| >40  <50  = 6.3 | | |
| >50  <60  = 8.1 | | |
| Fines        = 3.6 | | |

The castings were cured in the manner disclosed in Example 1. The castings were then tested for their tensile properties at 185° C. using a biaxial tensile testing.

| | Sample C | Sample D |
|---|---|---|
| Conc. of Particles in Casting | 12.0% | 12.0% |
| Young's Modulus | 217.20 | 215.70 |
| Ultimate Strain | 0.76 | 0.78 |
| Ultimate Stress | 72.7 | 77.0 |

Examples 2 and 3 demonstrate that the tensile properties of the acrylic composition according to the present invention can be altered and optimized by changing the concentration of crosslinker and/or the concentration of comonomer within the particles.

The present invention may be embodied in other specific forms without departing from the spirit and essential attributes thereof and accordingly, reference should be made to the appended claims, rather than to the foregoing specification, as indicating the scope of the invention.

We claim:

1. An acrylic composition comprising a matrix of polymethyl methacrylate having dispersed within it particles comprising 75 to 90 weight percent polymethyl methacrylate and greater than 10 to 25 weight percent of a comonomer comprising an ethylenically unsaturated monomer that copolymerizes with methylmethacrylate, wherein said particles comprise more than 0.4 weight percent of a crosslinker.

2. An acrylic composition as in claim 1, wherein said particles comprise greater than 10 to 20 weight percent of said comonomer.

3. An acrylic composition as in claim 1, wherein said comononer is selected from the group consisting of ethyl acrylate, butyl acrylate, propyl acrylate, isopropyl acrylate, t-butyl acrylate, isobutyl acrylate, ethyl methacrylate, butyl metharcylate, propyl methacrylate, isopropyl methacrylate, t-butyl methacrylate and isobutyl methacrylate.

4. An acrylic composition as in claim 3, wherein said comonomer is selected from the group consisting of butyl acrylate and ethyl acrylate.

5. An acrylic composition as in claim 1, wherein said crosslinker is selected from the group consisting of allyl methacrylate, allyl acrylate, triallyl phosphate, diallyl maleate, methallyl acrylate, vinyl methacrylate, divinyl benzene, ethylene glycol dimethacrylate, diethylene glycol dimethacrylate, triethylene glycol dimethacrylate and mixtures thereof.

6. An acrylic composition as in claim 5, wherein said crosslinker is ethylene glycol dimethacrylate.

7. An acrylic composition as in claim 1, wherein said crosslinker is used in an amount of 0.5 to 1.5 weight percent.

8. An acrylic composition as in claim 7, wherein said crosslinker is used in an amount of 0.6 to 1.0 weight percent.

9. An acrylic composition as in claim 1, wherein said particles have a particle size of 250–600 microns.

10. A method for preparing an article comprising thermoforming a cured acrylic composition comprising a matrix of polymethyl methacrylate having dispersed within it particles comprising 75 to 90 weight percent polymethyl methacrylate and greater than 10 to 25 weight percent of a comononer comprising an ethylenically unsaturated monomer that copolymerizes with methyl methacrylate, wherein said particles comprise more than 0.4 weight percent of a crosslinker.

11. A method as in claim 10, wherein said particles comprise greater than 10 to 20 weight percent of said comononer.

12. A method as in claim 10, wherein said comonomer is selected from the group consisting of ethyl acrylate, butyl acrylate propyl acrylate, isopropyl acrylate, t-butyl acrylate, isobutyl acrylate, ethyl methacrylate, butyl metharcylate, propyl methacrylate, isopropyl methacrylate, t-butyl methacrylate and isobutyl methacrylate.

13. A method as in claim 12, wherein said comononer is selected from the group consisting of butyl acrylate and ethyl acrylate.

14. A method as in claim 10, wherein said crosslinker is selected from the group consisting of allyl methacrylate, allyl acrylate, triallyl phosphate, diallyl maleate, methallyl acrylate, vinyl methacrylate, divinyl benzene, ethylene glycol dimethacrylate, triethylene glycol dimethacrylate and mixtures thereof.

15. A method as in claim 10, wherein said crosslinker is ethylene glycol dimethacrylate.

16. A method as in claim 10, wherein said crosslinker is used in amount of 0.5 to 1.5 weight percent.

17. A method as in claim 16, wherein said crosslinker is used in an amount of 0.6 to 1.0 weight percent.

18. A method as in claim 10, wherein said particles have a particle size of 250 to 600 microns.

19. A thermoformed article prepared by the method of claim 10.

* * * * *